(No Model.) 4 Sheets—Sheet 1.
E. P. FOX.
GRADING AND DITCHING APPARATUS.
No. 534,503. Patented Feb. 19, 1895.

(No Model.) 4 Sheets—Sheet 2.
E. P. FOX.
GRADING AND DITCHING APPARATUS.
No. 534,503. Patented Feb. 19, 1895.
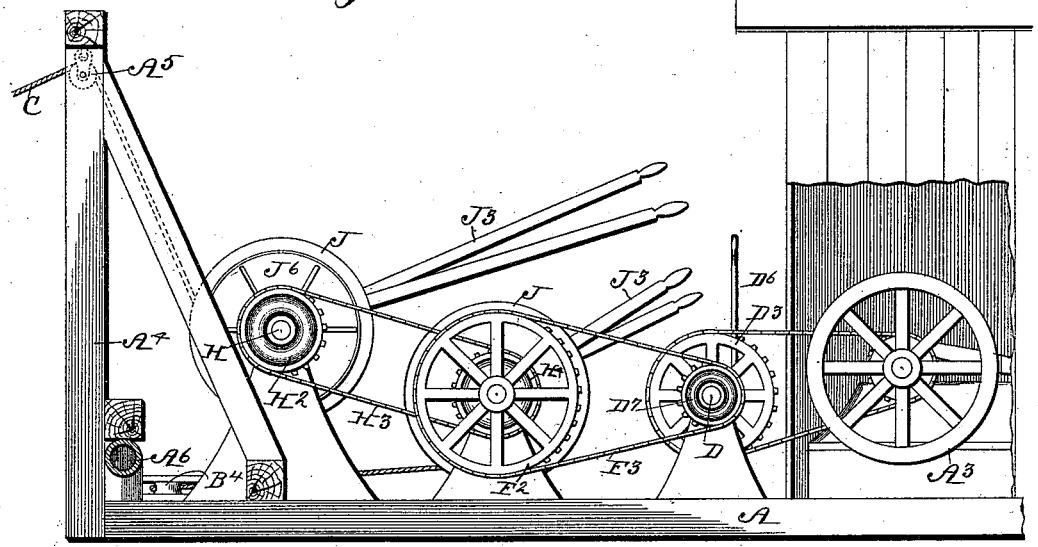
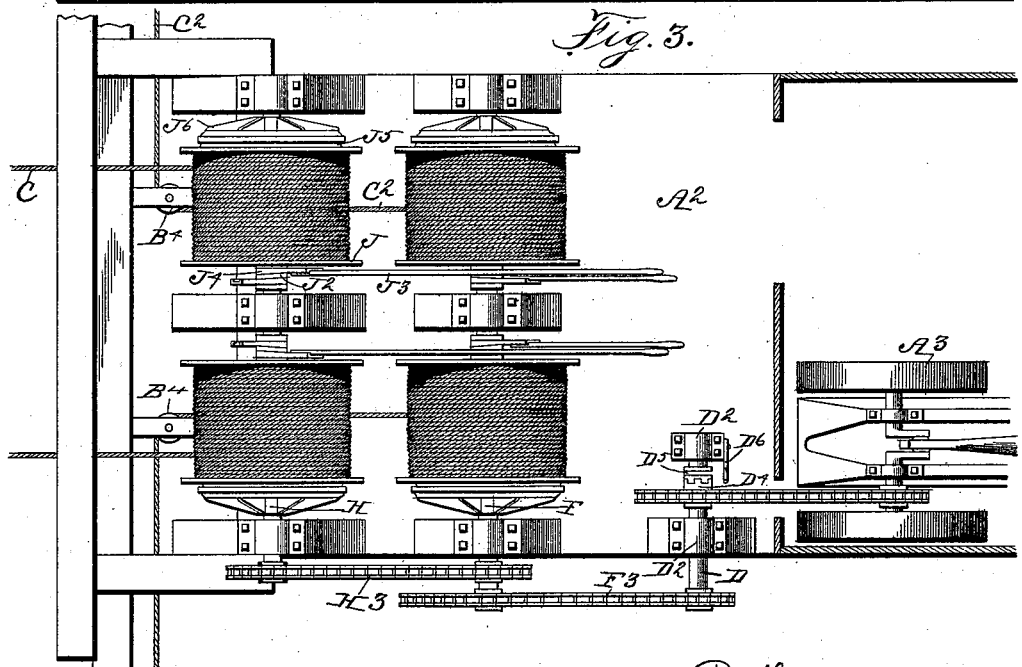

(No Model.) 4 Sheets—Sheet 3.
E. P. FOX.
GRADING AND DITCHING APPARATUS.
No. 534,503. Patented Feb. 19, 1895.
Fig. 4. 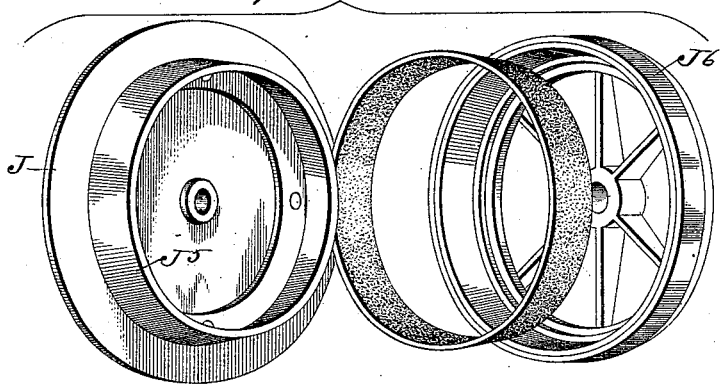 Fig. 5. 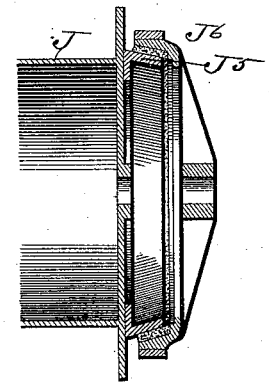
Fig. 6. 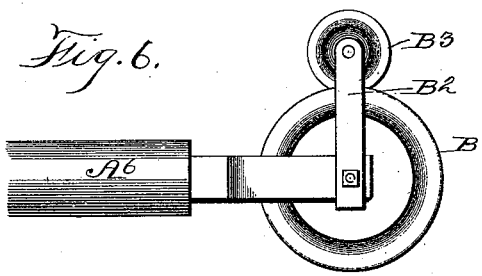 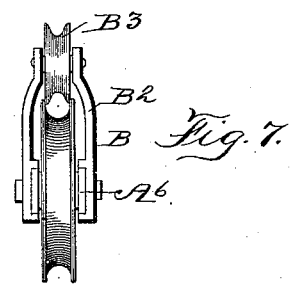 Fig. 7.

(No Model.) 4 Sheets—Sheet 4.

E. P. FOX.
GRADING AND DITCHING APPARATUS.

No. 534,503. Patented Feb. 19, 1895.

UNITED STATES PATENT OFFICE.

EDWARD P. FOX, OF GARNER, IOWA.

GRADING AND DITCHING APPARATUS.

SPECIFICATION forming part of Letters Patent No. 534,503, dated February 19, 1895.

Application filed December 26, 1894. Serial No. 533,038. (No model.)

*To all whom it may concern:*

Be it known that I, EDWARD P. FOX, a citizen of the United States of America, residing at Garner, in the county of Hancock and State of Iowa, have invented an Improved Apparatus for Grading and Ditching, of which the following is a specification.

The object of my invention is first to provide a simple, strong, and durable machine that may be easily and quickly transported and adapted to operate scrapers in the proper direction to dig ditches or grade land, and my object is further to produce an improved wheeled scraper that may be easily and quickly loaded and dumped and when moving backwardly or forwardly be easily steered.

My invention consists in certain details of construction, arrangement and combination of the various parts of the machine for operating the scraper and in the construction of the scraper, as hereinafter set forth, pointed out in my claims and illustrated in the accompanying drawings, in which—

Figure 1:
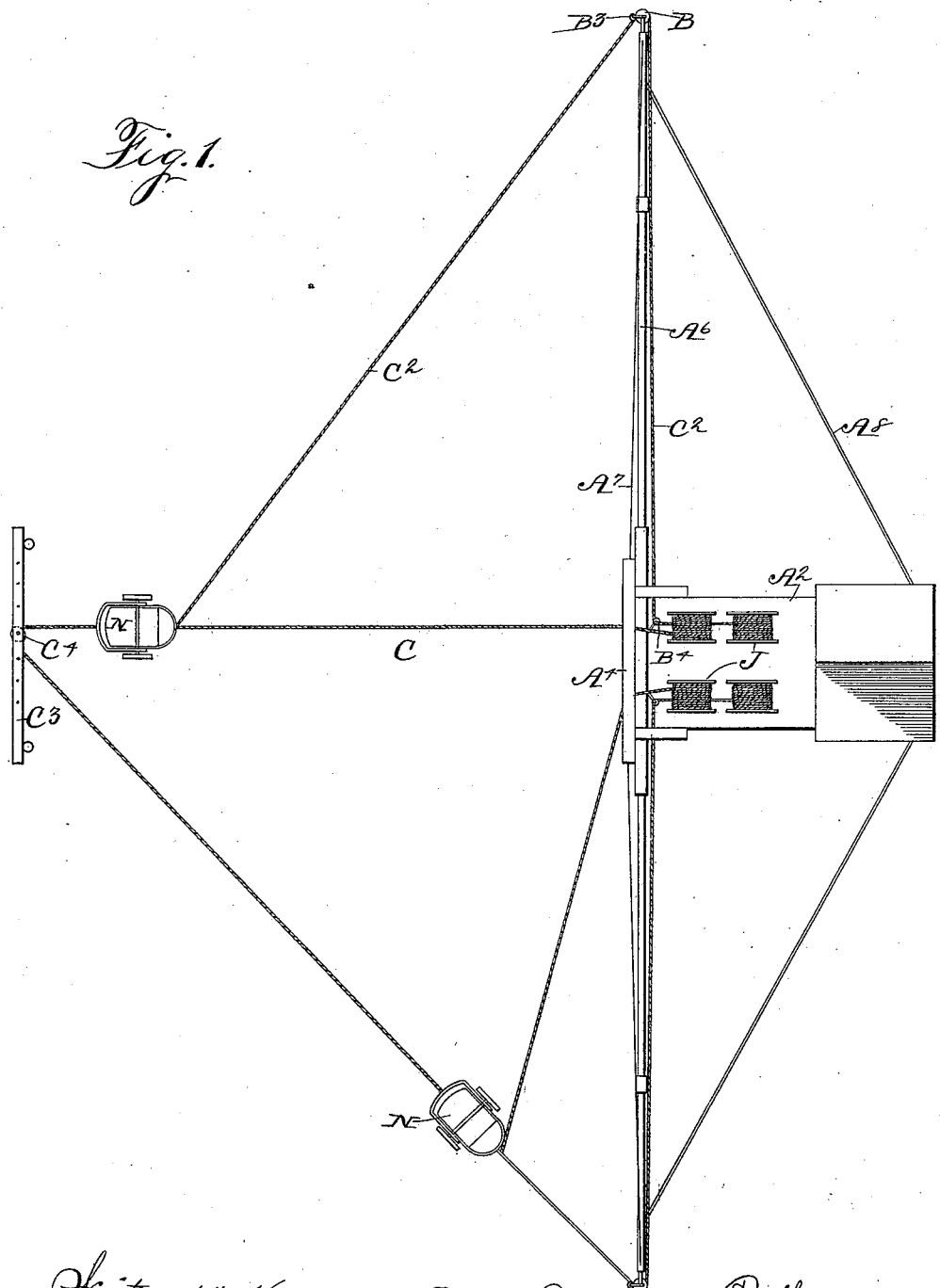
Figure 8:
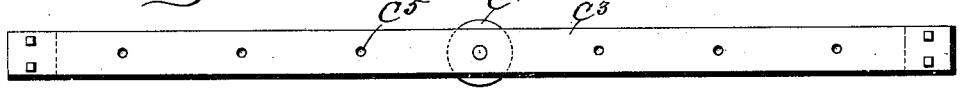
Figure 9:
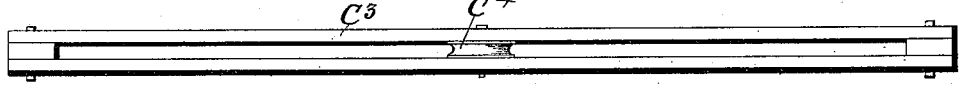
Figure 10:
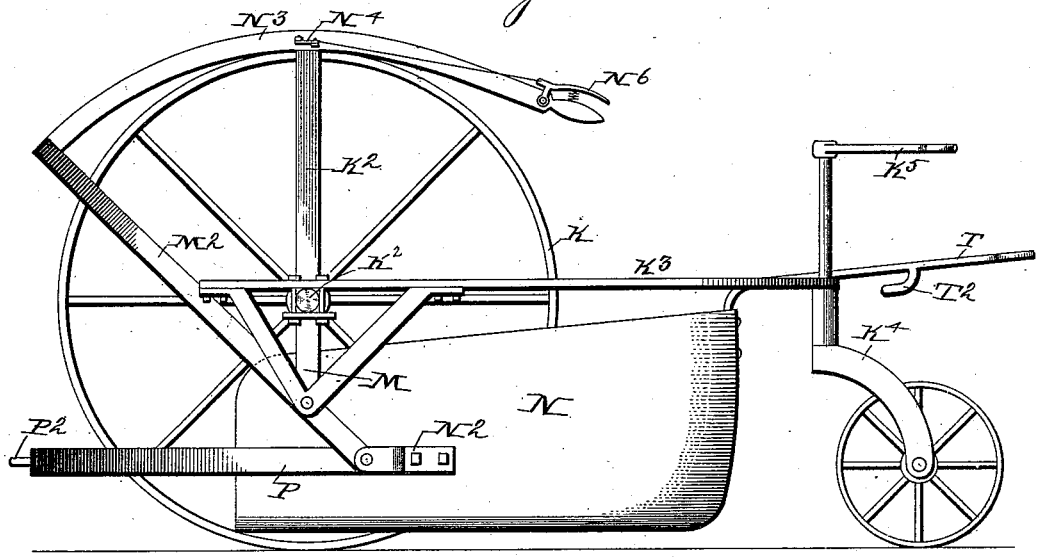
Figure 11:
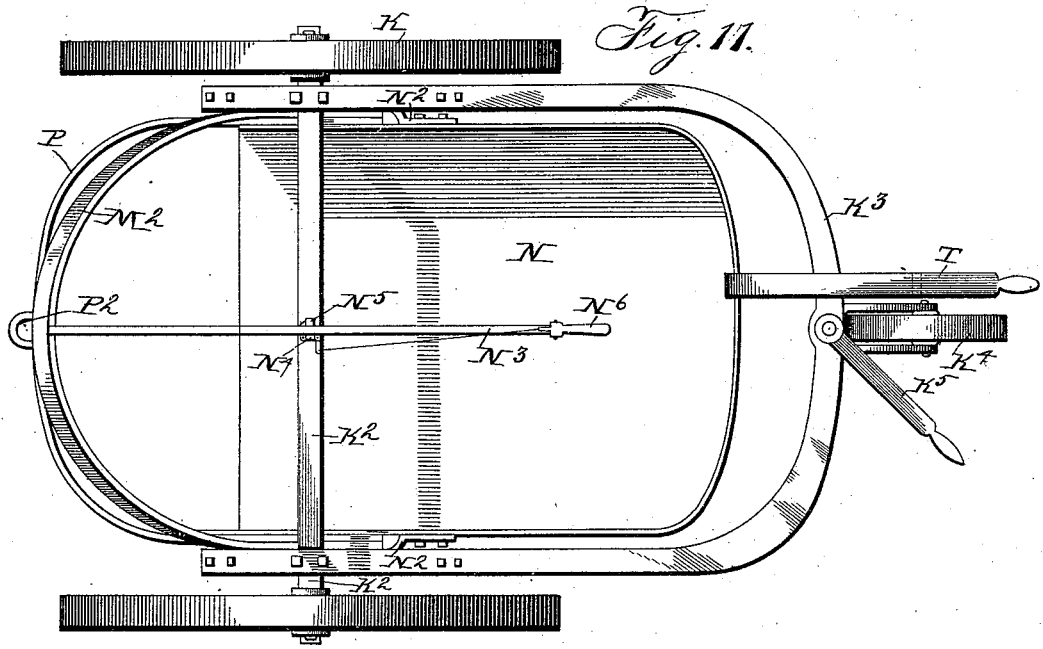

Figure 1 is a diagrammatical view of the complete apparatus. Fig. 2 is a side elevation of the cable operating mechanism. Fig. 3 is a top or plan view of the same. Fig. 4 is a detail perspective view showing the drum and friction clutch with the parts detached. Fig. 5 is a vertical transverse sectional view of the end of the drum and the friction clutch. Fig. 6 is a plan view of the end of the cable supporting arm. Fig. 7 is an end view of the same. Figs. 8 and 9 are respectively top and side views of the pulley supporting frame. Fig. 10 is a side elevation of the wheeled scraper, and Fig. 11 is a top view of the same.

Referring to the accompanying drawings, the reference letter A is used to indicate the sills or base of the machine frame having a platform $A^2$ mounted thereon. At the rear end of this platform is a suitable source of power preferably a hydro-carbon engine $A^3$.

$A^4$ is an upright frame at the front end of the platform to support the elevated pulleys $A^5$ over which the cables may be passed to draw the scrapers toward the machine.

$A^6$ indicates a support for pulleys preferably made of pipe and extended transversely of the front of the machine frame and projecting to each side thereof just as far as it is intended that the scrapers shall be moved laterally from the ditch. This pipe is jointed near each end so that if it is desired to adjust the length of the supports a section of suitable length may be inserted. Its outer end is supported vertically by means of the rod $A^7$ leading to the top of the machine frame and against a forward movement by the brace $A^8$ attached to the rear end of the frame. The outer end of this support is bifurcated and a pulley mounted therein.

$B^2$ indicates two arms fixed to the ends of the support and extended at right angles thereto, having a smaller pulley $B^3$, also provided with a concave surface, mounted between their outer ends and supported in position with its outer edges in engagement with, or in close proximity to, the inner surface of the edges of the larger pulley, so that a cable may be passed around the larger pulley and then between the two pulleys, to prevent the cable from slipping from the larger pulley.

$B^4$ are pulleys swiveled to the machine frame on the forward corners of the platform $A^2$.

To advance the scrapers straight toward the machine the cables C are attached, their front ends passed over the elevated pulleys $A^5$ and from thence to the winding drums.

To move the scrapers laterally the cables $C^2$ are attached thereto, passed between the pulleys $B^2$ and $B^3$ and around the pulleys $B^2$, from thence around the pulleys $B^4$ and both winding drums.

To move the scrapers backwardly I have provided a frame $C^3$ slotted in its central portion to admit a pulley $C^4$ and also provided with a number of vertical bores $C^5$ whereby the pulley may be adjusted laterally in said frame. This frame is adapted to be held in place by stakes driven into the ground surface on opposite sides of the ditch thereby supporting the pulleys $C^4$ elevated above the bottom of the ditch, and the cable $C^2$ is attached to the rear end of one scraper, passed around the pulley $C^4$ and to the rear end of the other scraper, so that when one scraper is being advanced the other will be drawn backwardly. The drums for winding said cables upon are operated as follows: D indicates a shaft mounted in bearings $D^2$ on the platform $A^2$ near the hydro-carbon engine and having a large sprocket wheel $D^3$ loosely mounted thereon with a dental clutch device $D^4$ formed integral therewith and a mating clutch $D^5$ feathered to the shaft and controlled by a lever $D^6$, and $D^7$ is a smaller sprocket wheel fixed to the shaft, thus increasing the speed and providing means for throwing the engine in or out of gear. F indicates a shaft mounted in suitable bearings on the platform $A^2$ in advance of the shaft D and geared thereto by means of the sprocket wheel $F^2$ fixed to the shaft and a chain $F^3$ connecting said sprocket with the wheel $D^7$. H indicates a like shaft mounted in bearings in advance of and above the shaft F and geared thereto by means of the sprocket wheel $H^2$ fixed to said shaft H and the chain $H^3$ connecting it with a sprocket wheel $H^4$ of like size fixed to the shaft F. It will be obvious that when the engine is in motion and the lever $D^6$ in position to hold the dental clutch in gear that both the shafts F and H will be rotated at a comparatively high rate of speed. Loosely mounted on each of these shafts are two drums J, J, each of which is provided with like independent mechanism for throwing it in or out of gear with the shaft as follows: $J^2$ indicates a cam loosely mounted on the shaft and $J^3$ is a lever also having a cam $J^4$ connected therewith to engage the cam $J^2$ and when drawn backwardly to force the drum outwardly in the ordinary manner. To the outer surface of the drum is bolted a flange $J^5$ that is slightly beveled inwardly toward the shaft. $J^6$ is a friction clutch device, firmly fixed to the shaft and adapted to receive the flange $J^5$. On its interior surface is a ring of fiber or other suitable material and on its outer surface is a wrought metal band secured thereto by shrinkage. Heretofore the drum and flange have been formed integral and the friction clutch feathered to the shaft and thrown in gear by being moved toward the drum. By this arrangement of parts the flange, which is the part least expensive and most liable to breakage and wear, is made in a separate piece and when broken or worn may be readily replaced and further the friction clutch device by being fixed to the shaft instead of feathered makes it possible to produce a strong and durable device not subject to breaking. The cables $C^2$ are wound upon the drums on the shaft F and the cables C are wound upon the forward drums and by this arrangement it will readily be seen that any one of the drums may be quickly and easily thrown into operation and that when one or both of the drums on one side are being wound up the others will be automatically unwound by the cable passed over the pulley at the rear end of the ditch.

In order to successfully operate this grading and ditching apparatus it will be obvious that a scraper must be provided that will readily move backwardly or forwardly and that may be quickly and easily set to load, to carry the earth and be easily dumped. The scraper comprises the wheels K, the axle $K^2$ arched at its central portion, the frame $K^3$ clamped at its front ends to the axle and curved backwardly around the rear of the scraper and having a caster wheel $K^4$ swiveled in its rear central portion and provided with a lever $K^5$ by which it may be steered.

M, M, indicate brackets bolted to the axles beneath the ends of the frame $K^3$ and projecting downwardly therefrom having their lower ends terminating in a horizontal journal held secure by the brace $M^2$ to the frame $K^3$. $M^3$ is a U-shaped lever fulcrumed near its ends to the said journals and having its ends pivotally connected with the scraper N (which is of the usual shape) near its forward end, by means of the brackets $N^2$. $N^3$ is a handle secured to said lever and curved upwardly over the axle $K^2$ and provided with a spring actuated latch device $N^4$ adapted to engage a projection $N^5$ on said axle and hold the lever from moving rearwardly and thereby permitting the forward end of the scoop to drop. To lower said forward end the latch is released by a pressure on the lever $N^6$ thus permitting the handle to move forwardly.

P indicates a bail pivoted to the brackets $N^2$ and curved forwardly. It is provided with a loop $P^2$ at its central portion to which the draft cables may be attached.

The rear end of the scraper is provided with an arm T fixed thereto and extended backwardly to overlap and rest upon the frame $K^3$ and $T^2$ is a hook formed on its under surface to engage the said frame when the scraper is moved to its forward limit (as when being loaded) and to clear the frame when in position for carrying. The rear end of this arm terminates in a handle which may be grasped to dump the scoop.

In practical use when it is desired to load the scraper the handle $N^3$ is moved toward the operator on the rear of the frame, the upper end of the lever $M^2$ drawn upwardly, and the forward end of the scraper forced downwardly and forwardly so that when advanced the scraper will fill with earth. The hook on the arm T will engage the rear end of the frame and prevent the scoop from turning over. Then when the scraper is full the handle $N^3$ is moved away from the operator and the upper end of the lever $M^2$ forced downwardly. Thus the forward end of the scraper is elevated and held in place by the spring latch device $N^4$, and the rear end supported by the arm T. When it is desired to dump the load the arm T is elevated and the forward end of the scraper made to engage the ground surface when the further advancement of the scraper will cause it to dump.

Having thus described each feature of the invention separately it will be obvious that the complete apparatus may be quickly and easily transported and set up ready for operation. The scrapers may then be readily moved backwardly and forwardly over the ground surface by the operator on the machine platform and the scrapers steered into position, loaded and dumped by an operator riding on the frame thereof.

What I claim is—

1. An apparatus for grading and ditching comprising a suitable frame, an engine mounted thereon, four drums on said frame means for throwing said drums in and out of gear with the engine, two supports extended laterally from the platform, a pulley in the outer end of each, pulleys swiveled to the platform in the rear of said lateral supports, cables wound upon the rear drum passed around said swiveled pulleys and around the pulleys in the ends of said lateral supports, two scrapers having cables attached to their forward ends, an elevated support on the front end of the machine frame, two pulleys mounted thereon, cables wound upon the forward drums passed over said pulley and attached to the front ends of said scrapers, a pulley fixed to a stationary support some distance in advance of the platform, a cable passed around said drum and attached to the rear ends of said scrapers, for the purposes stated.

2. In an improved grading and ditching apparatus, a suitable support, a pulley having a grooved periphery mounted therein, arms fixed to the support and extended laterally therefrom, a smaller pulley wheel having a grooved periphery mounted in said arms and having its edges admitted between the edges of the groove in the larger wheel, for the purposes stated.

3. In a grading and ditching apparatus, an improved wheel scraper, comprising a suitable frame mounted on wheels, a lever fulcrumed to said frame and having its lower end bifurcated and adapted to move in a plane downwardly and forwardly and vice versa, means for operating said lever, a scraper pivoted near its forward end to said lever, an arm fixed to the rear end of the scraper to rest upon the frame and having a hook projecting downwardly and then forwardly from its under side adapted to engage the frame when the forward end of the scraper is in position for loading and to clear said frame when the forward end of the scraper is elevated and moved rearwardly in position for carrying, so that said rear end may be raised to dump the scraper.

4. In a grading and ditching apparatus a scraper adapted to be moved both backwardly and forwardly, comprising two wheels, an axle therefor arched in its central portion, a frame connected with the axle and curved rearwardly around the scraper, a caster wheel mounted in the rear end of said frame, a lever connected therewith, a scraper proper, a lever fulcrumed to a fixed part of the frame and pivoted to the forward end portion of the scraper and so arranged that the said forward end of the scraper may be moved forwardly, to load, or raised and moved rearwardly, to carry, means for securing said forward end in an elevated position, a lever secured to the rear end of the scraper and extended over the rear end of the frame, a hook on its under side and a bail pivoted to the front end portion of the scraper for the purposes stated.

EDWARD P. FOX.

Witnesses:
ISAAC SWEIGARD,
WESLEY ALDRIDGE.